March 31, 1959     O. G. DUNCAN     2,880,261
STORAGE BATTERY WITH FLUSH SECONDARY COVER
Filed Feb. 14, 1956     2 Sheets-Sheet 1

INVENTOR
OWEN G. DUNCAN

ATTORNEYS

March 31, 1959     O. G. DUNCAN     2,880,261
STORAGE BATTERY WITH FLUSH SECONDARY COVER
Filed Feb. 14, 1956     2 Sheets-Sheet 2

INVENTOR
OWEN G. DUNCAN

BY

ATTORNEYS ic Office 2,880,261
Patented Mar. 31, 1959

2,880,261

STORAGE BATTERY WITH FLUSH SECONDARY COVER

Owen G. Duncan, Racine, Wis.

Application February 14, 1956, Serial No. 565,419

1 Claim. (Cl. 136—168)

This invention appertains to storage batteries of the small, compact type particularly designed for use with motorcycles and is an improvement over my battery shown in Patent No 2,303,622 issued to me December 1, 1942.

One of the primary objects of my invention is to provide a leakproof battery in which the top is substantially flush with the upper end of the case and one in which the projecting of cell connector straps above the cover has been eliminated.

Another salient object of my invention is to provide a storage battery having primary covers for the individual cells and a unitary secondary cover for completely closing the upper end of the battery case and fitting flush with the upper end of the case and defining in conjunction with the primary covers a chamber for the reception of a sealing compound which completely encloses cell connector straps and the like.

A further important object of my invention is the provision of means for utilizing the sealing compound as means for drawing the secondary closing cover down tight on the battery case to form in effect a solid integral closure for the upper end of the case including the primary cell covers, the sealing compound and the secondary cover.

A still further important object of my invention is the provision of means for introducing a quantity of the sealing compound into the chamber and over the primary cell covers before the placing of the secondary sealing cover in position and finally introducing the remaining portion of the sealing compound in a hot condition through openings in the secondary cover to completely fill the chamber so that, upon the cooling of the compound and the contraction thereof, the secondary cover will be drawn down tight on the case and in sealing contact therewith.

A still further object of the invention is the provision of means for supporting the central portion of the secondary cover, whereby to prevent the cover from being bowed inwardly during the cooling and contraction of the sealing compound.

A still further object of my invention is the provision of novel members for closing the pouring openings in the secondary cover and for firmly securing the members in place by the sealing compound.

With these and other objects in view, the invention consists in the novel construction, arrangement and formation of parts, as will be hereinafter more specifically described and claimed, and illustrated in the accompanying drawings, in which drawings, Figure 1 is a top plan view of my improved battery prior to the pouring of the sealing compound therein and the placing of the secondary sealing cover in position;

Figure 1:
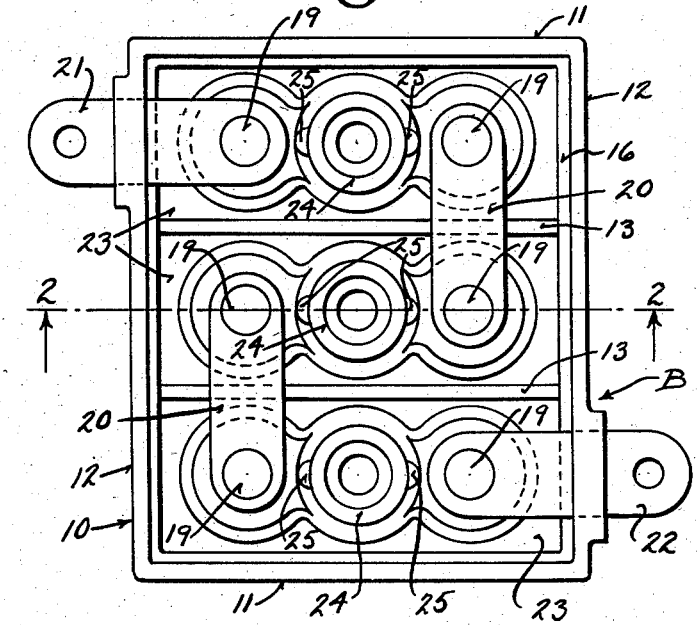

Referring to the drawings in detail, wherein similar reference characters designate corresponding parts throughout the several views, the letter B generally indicates my improved storage battery and the same includes a case 10 formed from a preferred dielectric and acid proof material. The case B includes end wall 11 and side walls 12. The case is divided transversely by partitions 13 to define individual cell compartments 14. In the present drawings, I have shown a three-cell battery but obviously, more or less cells can be provided. The partitions 13 terminate short of the upper end of the case and the side walls 12 on opposite sides of the partitions are provided with shoulders 15, for a purpose, which will later appear. The inner surface of the end walls 11 and the side walls 12 at the upper end of the case are rabbeted to provide a shoulder 16 which extends entirely around the case. It can be seen that the shoulder 16 is spaced from and is located above the shoulders 15.

The cells 14 receive the desired number of positive and negative plates 17 and 18 and these plates are held apart by the usual separators (not shown). The end plates of each group of plates in the cells are provided with terminal posts 19 and the terminal posts 19 of adjacent cells are connected by straps 20. The terminal posts of end cells located at diagonally opposite corners are provided with outwardly extending connector straps 21 and 22 which lead out through suitable openings formed in the side walls 12 of the case.

Figure 2:
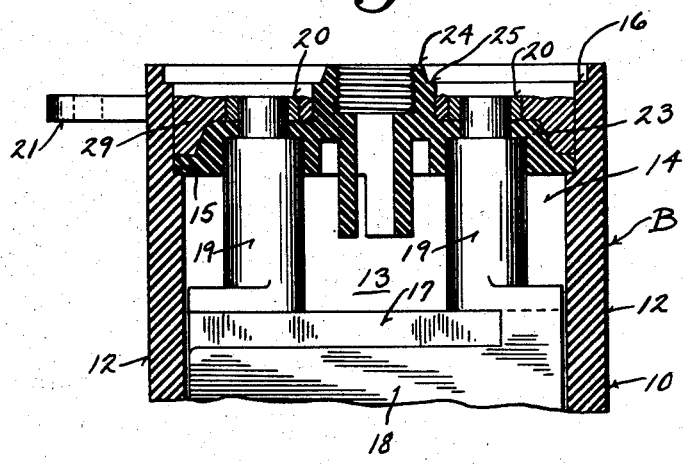
Figure 2 is a fragmentary vertical transverse sectional view through the battery taken on the line 2—2 of Figure 1, looking in the direction of the arrows and showing a quantity of the sealing compound poured over the primary cell covers.
Figure 3:
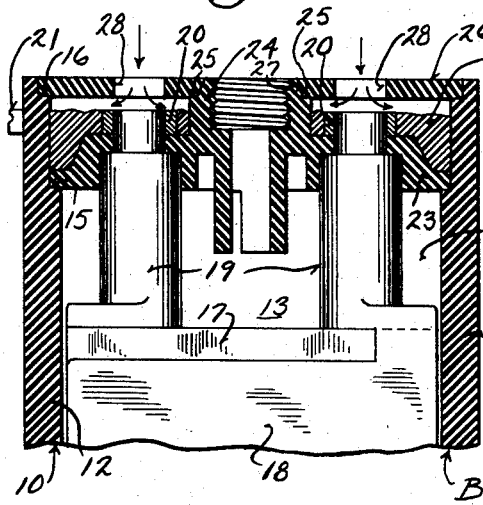
Figure 3 is a view similar to Figure 2 but showing the secondary sealing cover in position.
Figure 4:
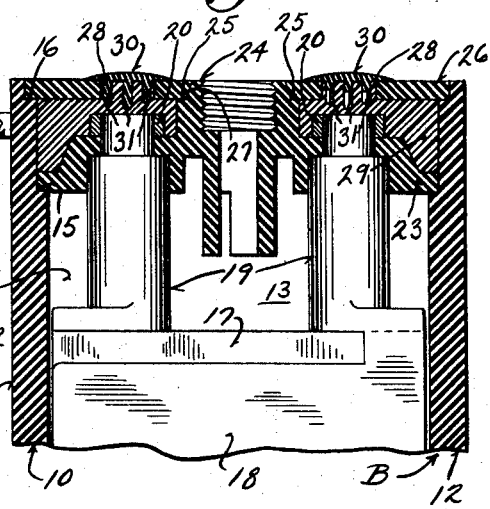
Figure 4 is a view similar to Figure 3, but showing the sealing compound completely filling the chamber and with the closure members for the pouring openings in position.
Figure 5:
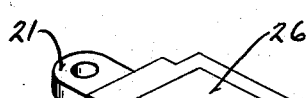
Figure 5 is a perspective view of the complete storage battery, with the exception of the closure plugs for the electrolyte filling nipples of the cells.

Prior to the placing of the connector straps 20 and the end terminal straps 21 and 22 in place, the cells are closed by hard rubber primary covers 23 and the ends of these covers fit on the shoulders 15. The covers are of such a size and shape as to completely close the individual cells and the terminal posts of the battery plates extend through openings in these primary covers. The primary covers also carry filling nipples 24 which are normally closed by threaded caps (not shown). In accordance with my invention, I form on the nipples 24 stop lugs 25 which terminate in the same horizontal plane with the shoulder 16. By referring to Figures 2, 3 and 4, it can be seen that the filling nipples 24 extend to the upper edge of the case and that the battery posts terminate below the upper ends of these nipples.

Also in accordance with my invention, I provide a flat secondary sealing cover 26 for the top of the battery case and this cover is adapted to fit snug on the shoulder 16. The secondary cover 26 is provided with a longitudinal row of openings 27 through which the filling nipples 24 extend and the nipples snugly engage in the openings 27. On each side of the openings 27 the auxiliary cover 26 is provided with filling openings 28, the purpose of which, will also later appear.

Upon the assembling of the battery and the placing of the primary covers 23 in place and the burning in of the connecting and terminal straps and before the placing of the secondary sealing cover 26 on its shoulder 16, hot sealing mastic or compound 29 is poured over the primary covers 23 and around the connector and terminal straps. After this, the auxiliary sealing cover 26 is placed in position and additional hot sealing compound is poured into the case through the openings 28 and mingles with the compound already poured into the case. It can be seen that when the auxiliary cover 26 is placed in position that a chamber is provided between the primary cell covers and the secondary sealing cover and this space or compartment is entirely sealed with the hot compound. As the compound reaches the pouring openings 28, the operator then determines that the compartment is filled with the compound and he is assured that the battery terminal posts, connector and terminal straps are covered. At this time, and while the compound is still hot closure discs 30 are placed over the filling openings 28. The discs are provided with depending legs 31 which extend into the compound. Actually, the compound tends to soften the auxiliary case cover 26 and as the compound is in intimate contact with the inner face of this auxiliary sealing cover the compound tends upon the cooling and contraction thereof to draw down on the auxiliary sealing cover and on the closure discs 30 and this assures the tight closing of the battery case and the positive sealing of the auxiliary cover and the closure discs. In fact, the seal is such that removal of the auxiliary cover plate 26 is practically impossible. Actually, a homogeneous bond is provided between the primary cell covers 23, the sealing compound, the auxiliary sealing cover 26 and the closure discs 30.

The sealing compound, as it cools and contracts tends to draw down the auxiliary cover to such an extent that the stop shoulders 27 are provided so as to hold the center of the cover against distortion and the drawing down of the cover assures a tight fit between the cover and the filling nipples.

From the foregoing description, it can be seen that I have provided a leakproof and watertight seal for the upper end of batteries which are subjected to severe vibrations and displacement to various angles from the vertical. The construction is such as to form an exceptionally rugged and durable battery so that the battery will be protected in case of spills on the motorcycle, or other equipment, and it is to be understood that the battery has many uses other than on motorcycles, such as outboard motors, motors for lawn mowers, etc.

While I have shown the terminal straps 21 and 22 extending out of the side walls of the battery case, it is to be understood that the battery terminals can extend out of the secondary cover itself, should such be necessary or desirable.

Changes in details may be made without departing from the spirit or the scope of this invention, but what I claim as new is:

A storage battery comprising a one-piece case having spaced partitions defining cell compartments, groups of plates in said cell compartments having terminal posts, the inner faces of the walls of the case having spaced upper and lower stepped shoulders, primary covers for the cells disposed below the upper edge of the case having openings receiving the posts, connector straps for certain terminal posts, terminal straps for certain other posts of the plates of the end cells, a one-piece secondary sealing cover fitted snugly in the upper end of said case and on said upper shoulders in spaced relation to the primary covers, and defining in said case between itself and the primary covers a sealing chamber extending the full length and width of the case, a sealing compound in said sealing chamber and completely filling the chamber and engaging the lower surface of the secondary sealing cover, said secondary sealing cover having filling openings for the sealing compound communicating with the sealing chamber when the secondary cover is placed in the case, all of said straps being disposed in said sealing chamber, and sealing discs closing said openings and having depending legs extending into the sealing compound.

References Cited in the file of this patent

UNITED STATES PATENTS

| | | |
|---|---|---|
| 1,973,250 | Gum | Sept. 11, 1934 |
| 1,983,507 | Woodbridge | Dec. 4, 1934 |
| 2,186,148 | Raney | Jan. 9, 1940 |
| 2,232,800 | Raney | Feb. 25, 1941 |
| 2,303,622 | Duncan | Dec. 1, 1942 |
| 2,637,758 | Shannon | May 5, 1953 |
| 2,672,497 | Burns | Mar. 16, 1954 |
| 2,704,781 | Mautner | Mar. 22, 1955 |